United States Patent
Diab et al.

(10) Patent No.: US 8,625,471 B2
(45) Date of Patent: Jan. 7, 2014

(54) SYSTEM AND METHOD FOR CARRIER DEFERRAL FOR FULL DUPLEX ENERGY EFFICIENT ETHERNET PHYS

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 614 days.

(21) Appl. No.: 12/205,670

(22) Filed: Sep. 5, 2008

(65) Prior Publication Data

US 2009/0201837 A1  Aug. 13, 2009

Related U.S. Application Data

(60) Provisional application No. 61/028,217, filed on Feb. 13, 2008.

(51) Int. Cl.
*H04B 7/005* (2006.01)
*H04B 1/44* (2006.01)

(52) U.S. Cl.
USPC .......................................... 370/278; 370/282

(58) Field of Classification Search
USPC ........................................................ 370/276
See application file for complete search history.

(56) References Cited

U.S. PATENT DOCUMENTS

| | | | |
|---|---|---|---|
| 6,029,202 A | | 2/2000 | Frazier et al. |
| 6,711,691 B1 * | | 3/2004 | Howard et al. ................ 713/300 |
| 2005/0163150 A1 * | | 7/2005 | Yang et al. ..................... 370/445 |
| 2006/0077995 A1 * | | 4/2006 | Lenell ............................. 370/412 |
| 2006/0182080 A1 * | | 8/2006 | Yang et al. ..................... 370/347 |
| 2008/0037467 A1 * | | 2/2008 | Diepstraten et al. ........... 370/330 |
| 2009/0077395 A1 * | | 3/2009 | Tsai ............................... 713/310 |
| 2011/0249674 A1 * | | 10/2011 | Chang et al. ................... 370/392 |

OTHER PUBLICATIONS

Dove, Energy Efficient Ethernet Switching Perspective, Jan. 2008, IEEE 802.3az Interim Meeting, Dove Networking Solutions for ProCurve Networking by HP.*
Healey et al., 1000BASE-T Low-Power Idle, Jan. 2008, IEEE P802.3az Task Force Meeting, LSI Corporation.*
Hays et al., Active/Idle Toggling with Low-Power Idle, Jan. 2008, IEEE 802.3az Task Force, Intel Corporation.*
Dove, Dan, Energy Efficient Ethernet Switching Perspective, Jan. 2008, IEEE 802.az Interim Meeting, Dove Networking Solutions for ProCurve Networking by HP.*

* cited by examiner

*Primary Examiner* — Michael Thier
*Assistant Examiner* — Brian Cox
(74) *Attorney, Agent, or Firm* — Duane S. Kobayashi

(57) ABSTRACT

A system and method for carrier deferral for full duplex energy efficient Ethernet (EEE) physical layer devices (PHYs). A carrier deferral signal can be asserted to a media access control layer to indicate to the media access control (MAC) layer that transmission of data is to be deferred due to a power savings initiative in the physical layer device. In one example, the carrier deferral signal is used when a PHY is awakened by the MAC when the MAC has something to transmit. In another example, the carrier deferral signal is used when a PHY is switching link rates.

19 Claims, 5 Drawing Sheets

SYSTEM AND METHOD FOR CARRIER DEFERRAL FOR FULL DUPLEX ENERGY EFFICIENT ETHERNET PHYS

This application claims priority to provisional application No. 61/028,217, filed Feb. 13, 2008, which is incorporated by reference herein, in its entirety, for all purposes.

BACKGROUND

1. Field of the Invention

The present invention relates generally to Ethernet systems and, more particularly, to a system and method for carrier deferral for full duplex energy efficient Ethernet (EEE) physical layer devices (PHYs).

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

One example of an EEE solution is a low power idle (LPI) mode. In general, LPI relies on turning the active channel silent when there is nothing to transmit. Energy is thereby saved when the link is off. Under common traffic scenarios, the remote side of the link will exhibit a high bit error rate (BER) when the physical layer device emerges out of LPI mode. What is needed therefore is a mechanism that enables the physical layer device to quickly emerge from a deep-sleep state without having an adverse impact on the BER.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

Figure 1:
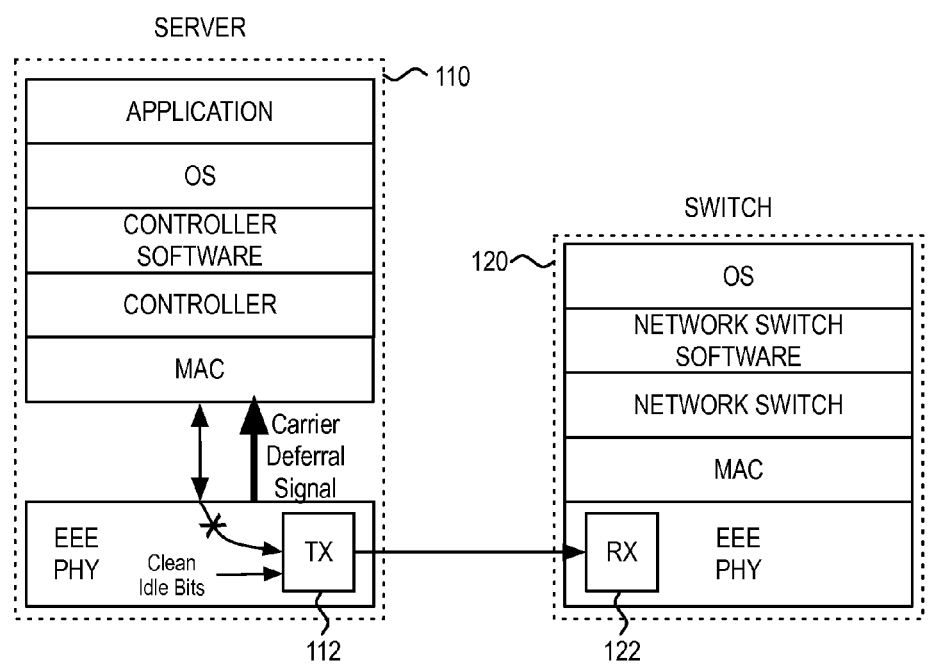
FIG. 1 illustrates an example of an end-to-end link that enables EEE functionality.

A system and method for carrier deferral for full duplex energy efficient Ethernet (EEE) physical layer devices (PHYs), substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair and backplane. IEEE 802.3az Energy Efficient Ethernet (EEE) continues to evaluate various methods for reducing energy used during periods of low link utilization. In this process, a protocol would be defined that would facilitate transition to and from lower power consumption modes in response to changes in network demand.

As noted, one of the protocols being considered is a low power idle (LPI) mode. In this mode, the active channel is turned silent, thereby saving energy. When a physical layer device (PHY) emerges out of a deep-sleep state in the LPI mode to accommodate the transmission of data, it is important that the PHY reacquire synchronization with the other end of the link. As part of this process, for example, the settings for the cancellers (e.g., echo, NEXT, FEXT, etc.) may need to be updated or reacquired/retrained. In the case of 100BASE-TX (Full Duplex) that utilize free running scramblers, an effective process of waking up from a deep-sleep state in the LPI mode would require seven to eight bytes (i.e., 60 clean idle bits) for both ends to acquire synchronization. If both sides of the link are not properly synchronized, then the BER would be driven higher.

In general, the BER can take a long time to stabilize as the PHYs transition out of the LPI mode into an active mode. For cases such as 100BASE-TX, the need for an initial transmission of 60 clean idle bits has multiple effects. First, it increases the wake time from the deep sleep/LPI state. Second, and more importantly, it requires the MAC to hold off transmission of the frames until enough clean idle bits have been sent to the other side.

One possibility for accommodating the need to hold off transmission is to require buffering in the PHY to allow for the transmission of the clean idle bits. Unfortunately, this buffering option unnecessarily complicates the PHY implementation in supporting LPI as modern 802.3 PHYs are not specified to provide buffering. Moreover, the inclusion of buffering in the PHY would incur additional latency, which could be a significant issue for latency-sensitive traffic.

In accordance with the present invention, the transmission of the clean idle bits can be accommodated without requiring any buffering in the PHY or any modification of the MAC. The later benefit is significant in the EEE framework because it enables an EEE PHY to be coupled to existing legacy MACs. In other words, an EEE PHY can switch into and out of a deep-sleep state LPI mode whether or not the MAC to which it is coupled supports EEE PHYs. This feature is significant when considering the large market of controller or switch chips that integrate a MAC. EEE benefits can therefore accrue to existing legacy devices without requiring an overhaul of the entire device.

Figure 2:
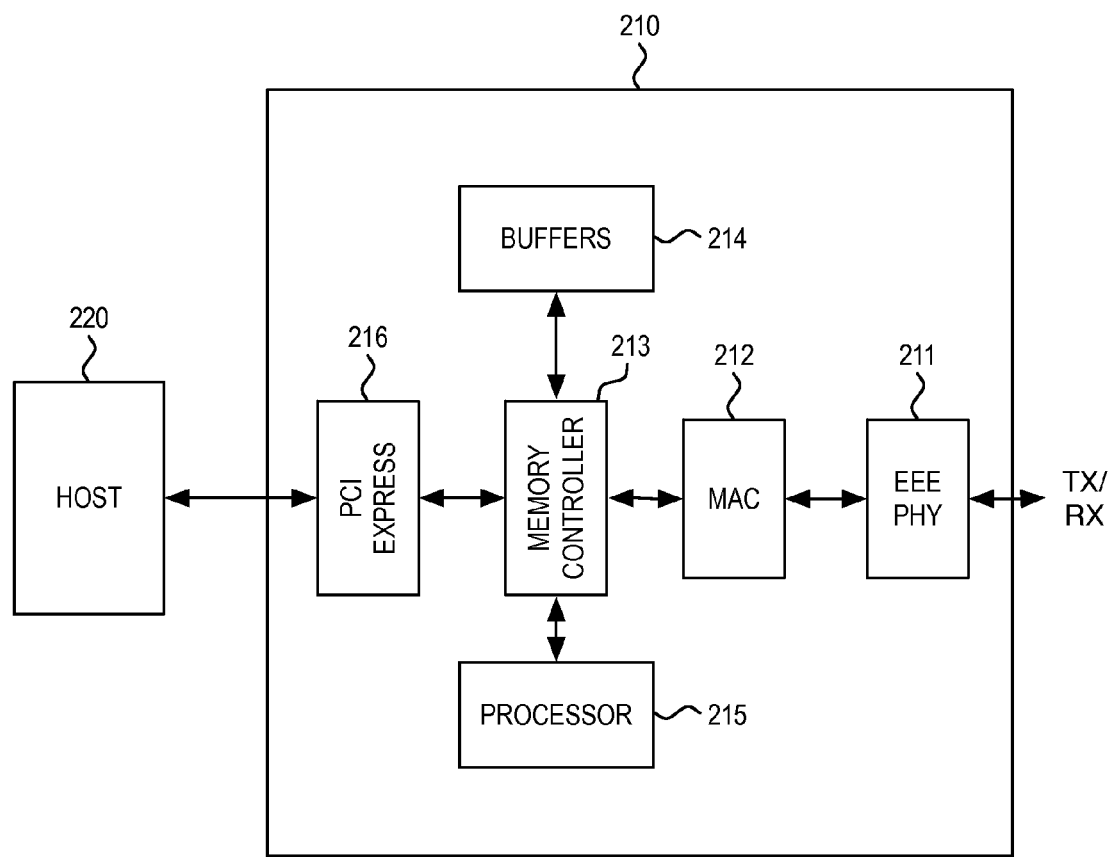
FIG. 2 illustrates an example of a controller.

To illustrate these features of the present invention, reference is now made to the example end-to-end link of FIG. 1. As illustrated, server 110 is coupled to switch 120 by a link supported by EEE PHYs. FIG. 2 illustrates one example of a controller such as that within server 110. As would be appreciated, a controller can generally be part of a client (e.g., laptop, desktop or workstation), a server (e.g., audio-video (AV) server, high performance computing (HPC) server), or a consumer edge device (e.g., HDTV, Blueray, etc.). As illustrated, host system 220 is coupled to integrated Ethernet controller 210. Ethernet controller 210 further includes EEE PHY 211, which is coupled to MAC 212. In the illustrated example, MAC 212 is coupled to PCI Express device 216 via memory controller 213, which is also coupled to buffers 214 and processor 215.

Figure 3:
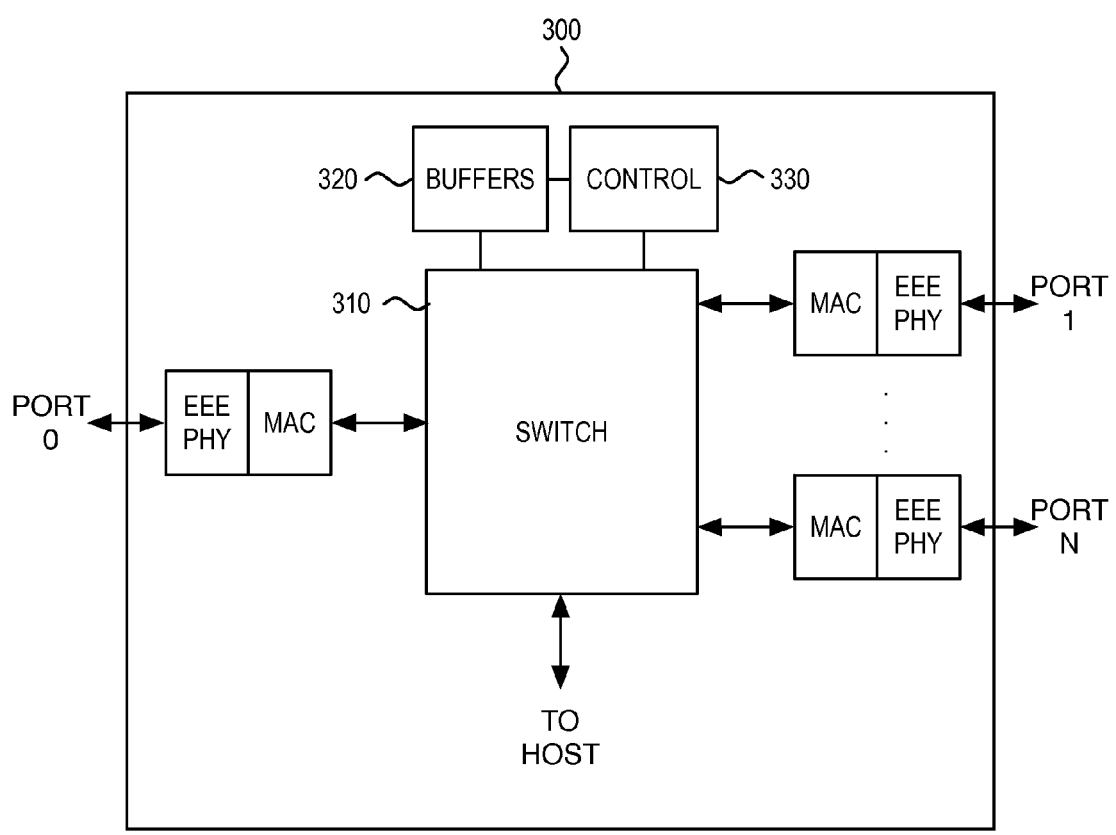
FIG. 3 illustrates an example of a switch.

FIG. 3 illustrates one example of a network switch. In various examples, switching system 300 can represent a router or any other device that incorporates multi-port switch functionality. In various examples, the switch can be a consumer, SMB, enterprise, metro, or access switch. In another example, switching system 300 can represent a voice over IP (VoIP) chip that has a network interface (Port 0) and a PC interface (Port 1). In yet another example, switching system 300 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 300 can represent an access point such as a WLAN base station. As illustrated, switching system 300 includes switch 310 that supports a host connection (e.g., internal port) and a plurality of external ports 0-N via MAC and EEE PHY interfaces. Switch 310 is also supported by buffers 320 and control 330.

In the illustration of FIG. 1, only a single direction of a full duplex is shown where transmitter (TX) 112 in server 110 transmits traffic to receiver (RX) 122 in switch 120. As would be appreciated, the principles of the present invention can be applied to both directions of the link.

It should also be noted that the principles of the present invention can also be applied to symmetric or asymmetric applications of EEE. In a symmetric application of EEE, both direction of the link would transition between various power consumption modes in a coordinated fashion. In an asymmetric application of EEE, the two directions of the link would transition between various power consumption modes independently.

In the present invention, a coordinated control policy can be used to impact the operation of a PHY. In general, EEE mechanisms can touch a number of devices and software throughout the stack and across the link. In the example illustration of a link in FIG. 1, energy savings are sought to be effected in the link between the PHYs in the server and the switch. The control policy that governs the operation of the link between the PHYs can be implemented in one or more of the PHY, MAC, MAC control, MAC client, or higher layer in the server and/or switch. As would be appreciated, the particular mechanism by which the control policy is effected would be implementation dependent. The key, however, is the linkage of the control policy to the EEE savings that can be produced in transitioning the operation of the PHYs. In one example, a coordinated control policy can include the exchange of load information by the two ends of the link ahead of time. In other examples, the coordinated control policy can be designed to monitor subsystem states (e.g., PCI Express going to sleep), buffer level relative to a watermark, a rate of change of a traffic queue, etc.

When the EEE control policy indicates that the EEE PHYs should enter into an LPI mode, the EEE PHYs enter into a deep-sleep state. As noted above, this can be a result of a multitude of trigger events. For example, the EEE PHY can enter into an LPI mode after the control policy above the MAC has determined that it wants to go into EEE mode, and that the PHY has been through an access into its register space. In another example, the EEE PHY can have enough intelligence and/or buffering to determine the trigger event. Regardless of the process by which the EE PHY enters into an LPI mode, the PHY can assert a carrier deferral signal to hold off the MAC.

Figure 4:
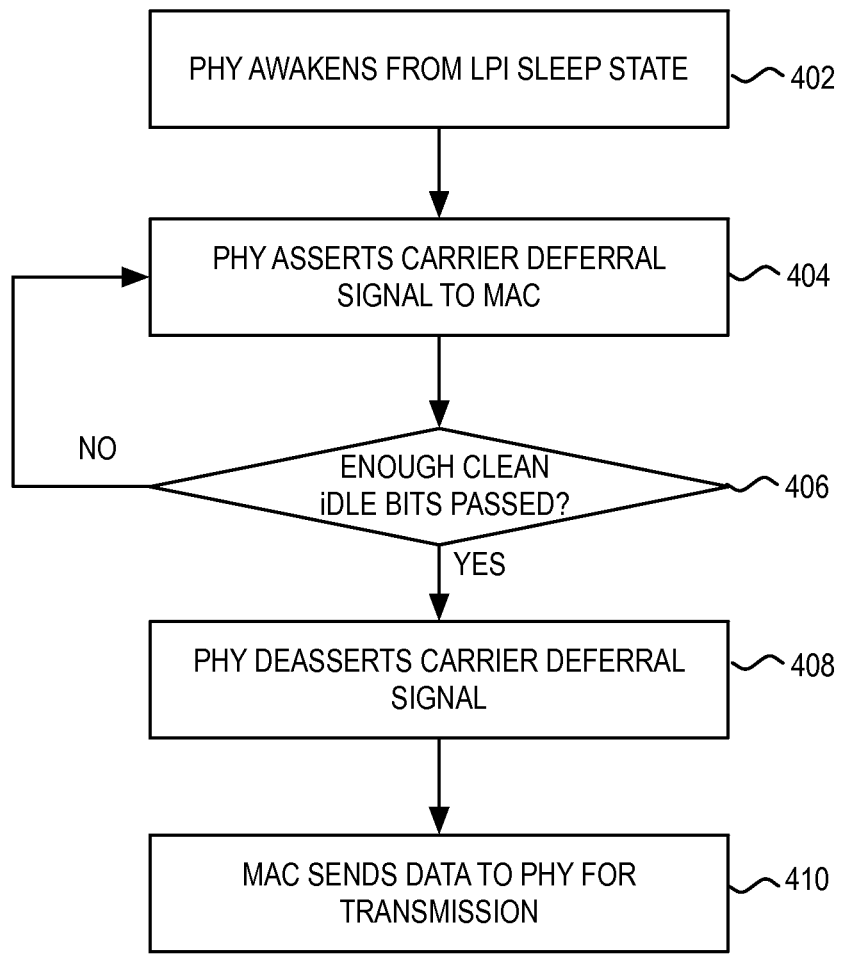
FIG. 4 illustrates a flowchart of a process of carrier deferral for full duplex low power idle physical layer devices.

As noted, emerging from this deep-sleep state can lead to a rise in the BER. Reduction of this BER can be accomplished by a process such as that illustrated in FIG. 4. As illustrated, the process begins at step 402 where an EEE PHY awakens from a deep-sleep state in LPI mode. This awakening can be prompted, for example, by the MAC when it has something to transmit over the link.

Next, at step 404, the EEE PHY then asserts a carrier deferral signal (CRS) to the MAC layer. As illustrated in FIG. 1, the CRS is transmitted from PHY 112 to the MAC in server 110. Conventionally, the CRS has been used in half-duplex links to alert a deference element in the MAC that the medium is occupied and that transmission must be deferred.

In the context of the full-duplex link of the present invention, the CRS is used not to signal that the medium is occupied with incoming data, but that the transmission is deferred for the transmission of other outgoing data. This other outgoing data is the 60 clean idle bits that are used to enable synchronization in the free running scramblers. In FIG. 1, this deferral scenario is illustrated by the figurative break in the communication path between the MAC in server 110 and transmitter 112 in the EEE PHY. This transmission deferral is made in lieu of the completion of the transmission of a set of clean idle bits.

After the CRS is asserted at step 404, a determination is then made at step 406 as to whether enough clean idle bits have passed. If it is determined that not enough clean idle bits have passed, then the EEE PHY continues to assert the CRS to the MAC. After it is determined that enough clean idle bits have passed, then the PHY can deassert the CRS at step 408. The deassertion of the CRS will then alert the MAC that the medium is ready for use for the transmission of data. The MAC can then proceed to send data to the EEE PHY for transmission at step 410. While the above description was provided in the context of 100BASE-TX, it should be noted that the principles of the present invention can be applied to any PHY that has a free running scrambler that requires clean idle bits to synchronize.

As has been described, the assertion and deassertion of the CRS leverages existing functionality in the PHY for half-duplex links. The receipt of such a signal by the MAC is therefore accommodated without requiring a modification to the MAC.

Figure 5:
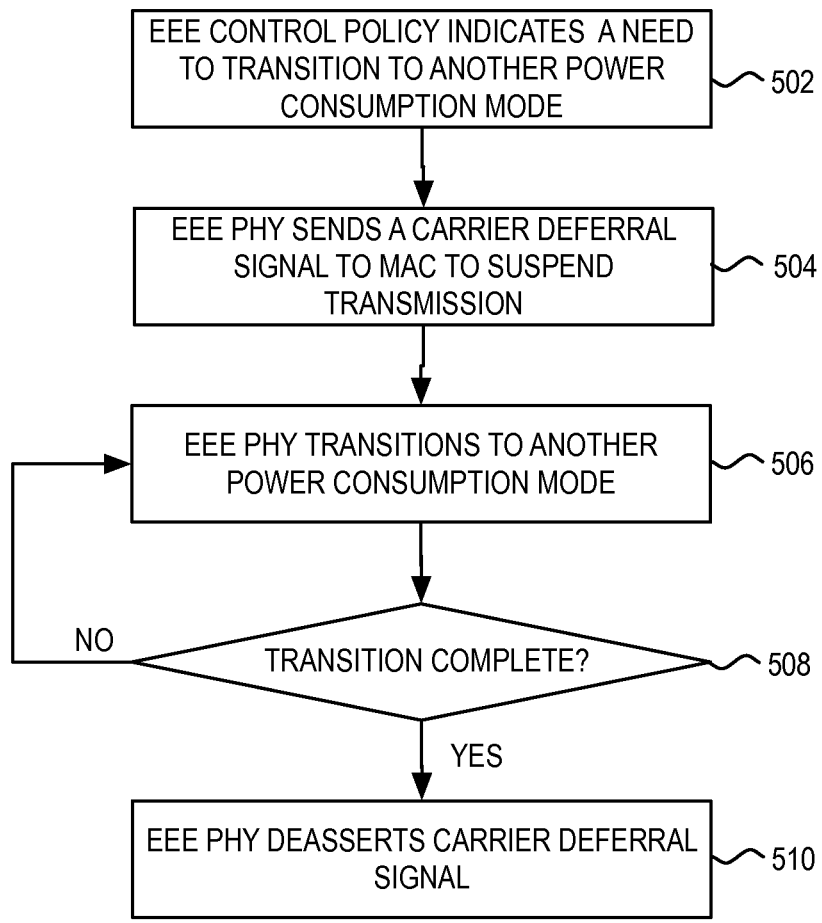
FIG. 5 illustrates a flowchart of an EEE process that uses carrier deferral.

To further illustrate the features of the present invention, reference is now made to the flowchart of FIG. 5. As illustrated, the process begins at step 502 where an EEE control policy indicates the need to transition to another power consumption mode. In one example, the transition can represent a transition into or out of an LPI mode, a transition in link rate up or down for subset PHYs, etc. As would be appreciated, the EEE control policy can be based on an analysis of various link-related parameters on either end of the link. Regardless of the particular EEE control policy that is utilized, the PHY is alerted of the indicated need to transition to another power consumption mode.

Upon such an indication, the EEE PHY then sends a carrier deferral signal to the MAC, at step 504, for the MAC to suspend transmission of traffic to the EEE PHY that originated the carrier deferral signal. Next, at step 506, the EEE PHY then transitions to another power consumption mode.

In general, the carrier deferral signal is used to hold off the MAC from transmitting anything. Effectively, from the MAC's perspective, when the carrier deferral signal is asserted it means that the medium is not available. Within the context of EEE, the carrier deferral signal can mean that the PHY itself is not available (e.g., due to the transmission of clean idle bits, transition in link rate, etc.). As would be appreciated, the specific timing between the assertion of the carrier deferral signal and the transition between various power consumption modes would be implementation dependent.

Returning to the flow chart of FIG. 5, it is then determined at step 508 whether the transition by the EEE PHY is complete. If it is determined that the transmission by the EEE PHY is complete, then the EEE PHY would deassert the carrier deferral signal at step 510. Upon such a deassertion, the MAC could then proceed to resume the previously suspended transmission of data to the PHY.

As has been described, an EEE control policy can be used to trigger the generation of a carrier deferral signal, thereby leveraging existing flow control mechanisms in a unique manner. In an alternative embodiment, a software mechanism can be used to simulate the receipt of a EEE PHY generated carrier deferral signal. For example, if the MAC has a carrier deferral variable that is programmable, the software mechanism can "fake" the carrier deferral event and set the variable, thereby holding off the MAC. As such, the hardware carrier deferral signal mechanism need not actually be triggered to achieve the results that are effected in software. In a further embodiment, a PHY without the carrier deferral signal circuitry can be used with the software mechanism that simulates the receipt of a EEE PHY generated carrier deferral signal. It should also be noted that the principles of the present invention can be broadly applied to various contexts, such as in all PHYs that implement EEE (e.g., backplane, twisted pair, optical, etc.). Moreover, the principles of the present invention can be applied to standard or non-standard (e.g., 2.5 G, 5 G, etc.) link rates, as well as future link rates (e.g., 40 G, 100 G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficient Ethernet method in a first physical layer device that is coupled to a second physical layer device via a transmission medium, comprising:
   awakening said first physical layer device from a low power consumption mode into a higher power consumption mode;
   asserting, by said first physical layer device, a carrier deferral signal from said awakened first physical layer device to a media access control layer device, said media access control layer device being directly coupled to said first physical layer device via an interface and being configured to recognize said carrier deferral signal as an indication that transmission of data by said media access control layer device is to be deferred due to an unavailability of said transmission medium used by said awakened first physical layer device; and
   deasserting, by said first physical layer device, said carrier deferral signal after it is determined that a set of bits used for synchronization of said first and second physical layer device has been passed from said first physical layer device to said second physical layer device.

2. The method of claim 1, wherein said first physical layer device is a 100 BASE-TX physical layer device.

3. The method of claim 1, wherein said low power consumption mode is a low power idle mode.

4. The method of claim 1, wherein said asserting is simulated using software.

5. The method of claim 1, wherein said asserting comprises setting a carrier deferral variable via software.

6. A method in a first physical layer device that is coupled to a second physical layer device via a transmission medium, comprising:
   asserting, by said first physical layer device, a carrier deferral signal to a media access control layer device, said media access control layer device being directly coupled to said first physical layer device via an interface and being configured to recognize said carrier deferral signal as an indication that a transmission of a first stream of data by said media access control layer device is to be deferred due to an unavailability of a transmission medium used by said first physical layer device;
   during said deferral by said media access control layer device, transmitting, by said first physical layer device, a second stream of data to said second physical layer device via said transmission medium; and
   upon completion of said transmission of said second stream of data, deasserting, by said first physical layer device, said carrier deferral signal.

7. The method of claim 6, wherein said second stream of data includes bits that enable synchronization of said first and second physical layer devices.

8. The method of claim 6, wherein said asserting occurs after said first physical layer device has a transition in power consumption mode.

9. The method of claim 6, wherein said media access control layer device transmits said first stream of data to said first physical layer device upon said deassertion of said carrier deferral signal.

10. The method of claim 6, wherein said asserting is simulated using software.

11. The method of claim 6, wherein said asserting comprises setting a carrier deferral variable via software.

12. A network node, comprising:
   a media access control layer device, said media access control layer device being configured to recognize a carrier deferral signal as an indication that a transmission of data by said media access control layer device is to be deferred due to an unavailability of a transmission medium; and a first physical layer device that communicates with said media access control layer device via a directly coupled interface, said first physical layer device being coupled to a second physical layer device via said transmission medium, said first physical layer device being operative to assert a carrier deferral signal to said media access control layer device upon a power savings initiative in said first physical layer device, said power savings initiative including a transmission of data from said first physical layer device to said second physical layer device over said transmission medium while said carrier deferral signal is asserted, said first physical layer device also being operative to deassert said carrier deferral signal after it is determined that said transmission of data from said first physical layer device to said second physical layer device over said transmission medium is completed.

13. The network node of claim 12, wherein said power savings initiative is a transition in power consumption mode by said first physical layer device.

14. The network node of claim 12, wherein said first physical layer device is a twisted pair physical layer device.

15. The network node of claim 12, wherein said first physical layer device is a backplane physical layer device.

16. The network node of claim 12, wherein said first physical layer device is an optical physical layer device.

17. The network node of claim 12, wherein said first physical layer device operates at a standard link rate.

18. The network node of claim 12, wherein said first physical layer device operates at a non-standard link rate.

19. The network node of claim 12, wherein said first physical layer device operates at a 100 Gbit/s link rate.

* * * * *